United States Patent
Weinert et al.

(10) Patent No.: US 7,802,233 B2
(45) Date of Patent: Sep. 21, 2010

(54) AUTOMATED DISPLAY OF TRACE HISTORICAL DATA

(75) Inventors: Alexander T. Weinert, Seattle, WA (US); Lorenz S. Prem, Redmond, WA (US); Xiao Xie, Min Hang District (CN); Kan Zhang, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 1271 days.

(21) Appl. No.: 11/342,775

(22) Filed: Jan. 30, 2006

(65) Prior Publication Data

US 2007/0220360 A1    Sep. 20, 2007

(51) Int. Cl.
*G06F 9/44* (2006.01)

(52) U.S. Cl. .................. 717/125; 717/124; 717/127; 717/128

(58) Field of Classification Search ............... None
See application file for complete search history.

(56) References Cited

U.S. PATENT DOCUMENTS 5,862,381 A * 1/1999 Advani et al. ............... 717/125
7,380,239 B1 * 5/2008 Srivastava et al. ........... 717/128

OTHER PUBLICATIONS

Interaction Diagrams: http://pigseye.kennesaw.edu/~dbraun/csis4650/A&D/UML_tutorial/interaction.htm.
Introduction to OMG's Unified Modeling Language (UML), http://www.omg.org/gettingstarted/what_is_uml.htm.
Sequence Diagram in UML, Mander Chitnis, Pravin Tiwari, & Lakshmi Ananthamurthy, http://www.developer.com/design/article.php/3080941.
Introduction to UML Sequence Diagrams: Bruce Powel Douglas; http://embedded.com/story/OEG20030521S0061.

* cited by examiner

*Primary Examiner*—Lewis A Bullock, Jr.
*Assistant Examiner*—Mark A Gooray
(74) *Attorney, Agent, or Firm*—Workman Nydegger

(57) ABSTRACT

The intuitive display of trace historical data in a manner that processing control transfer between processing entities is represented in the context of trace data from multiple processing entities. For each processing entity, a set of one or more trace entries are identified for that processing entity and displayed in a manner that the trace entries for the processing entity are shown associated with the processing entity. The transfer of control between processing entities is also shown in a manner that illustrates a transfer of processing control.

14 Claims, 5 Drawing Sheets

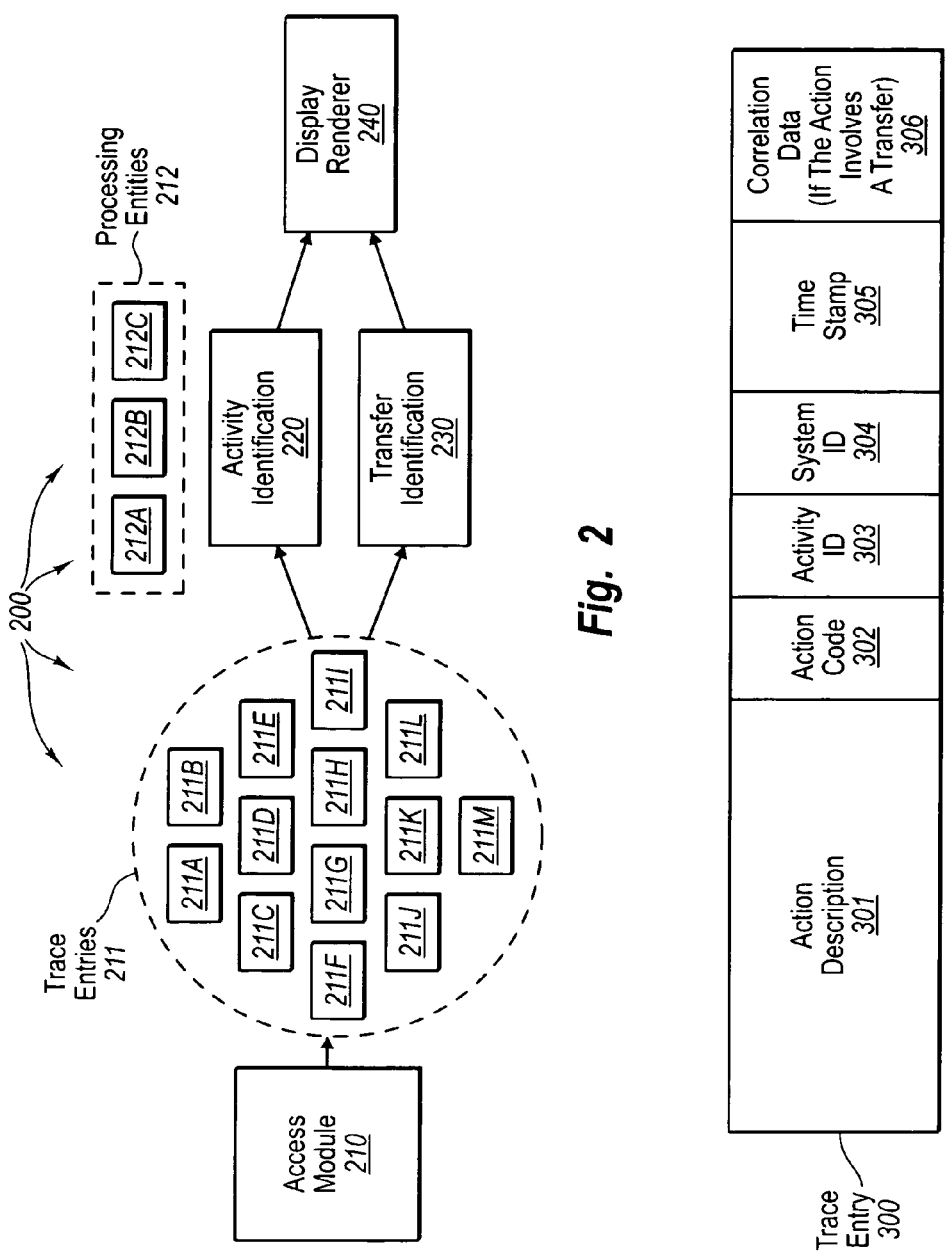

AUTOMATED DISPLAY OF TRACE HISTORICAL DATA

BACKGROUND

Background and Relevant Art

Computing systems have revolutionized the way we work and play. Computing systems come in a wide variety of forms including laptop computers, desktop computers, personal digital assistants, telephones, and even devices that have not been conventionally associated with computing systems such as, for example, refrigerators and automobiles. Computing systems may even comprise a number of constituent computing systems interconnected via a network. Thus, some computing systems may be small enough to fit in the palm of the hand, while others are spread over much of the globe.

Regardless of their physical form, computing systems are composed of hardware and software. The hardware includes most fundamentally at least one processor and memory. The software includes instructions that may be embodied in the memory and/or in storage, and can be accessed and executed by the processor(s) to direct the overall functionality of the computing system. Thus, software plays a critical role in driving computing system functionality.

In order to construct software, a human being programmer first writes code that conforms to a programming language that contains syntax and semantics that are human readable and/or intuitive to a human being. Such code is referred to as "source code". The source code is then compiled and/or interpreted into machine-readable binary for execution by a computing system.

As the capabilities of computing systems have increased, so has the complexity of the software that drives the computing system. Even the most basic of computer programs may be derived from thousands of lines of source code. Software programs can be so complex that despite diligent efforts from experienced software experts, the software may still not perform as designed in some circumstances. In order to diagnose what the problem is, software often causes to be written human-interpretable diagnostic information while executing. An entry of this diagnostic information is often termed a "trace" or "trace entry". By reviewing the trace entries, a software professional may often diagnose the problem with the software, so that an appropriate fix may be implemented.

Trace information may even be recorded by distributed systems, where each system node may record its own historical trace information. The amount of trace information can be truly overwhelming or at least time consuming for a human being to interpret, especially in distributed systems.

BRIEF SUMMARY

Embodiments of the present invention relate to the intuitive display of trace historical data in a manner that processing control transfer between processing entities is represented in the context of trace data from multiple processing entities. For each processing entity, a set of one or more trace entries are identified for that processing entity and displayed in a manner that the trace entries for the processing entity are shown associated with the processing entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates example schematic data structures and flows that may be used by the computing system of FIG. 1 to implement features of the present invention;

FIG. 3 schematically illustrates a trace entry data structure that may be used by embodiments of the present invention;

DETAILED DESCRIPTION

Embodiments of the present invention extend to the intuitive display of trace historical data in a manner that processing control transfer between processing entities is visually represented in the context of trace data of the processing entities. First, an example computing system in which features of the present invention may operate will be described with respect to FIG. 1. Then, embodiments of the present invention will be described in further detail with respect to FIGS. 2 through 7.

Figure 1:
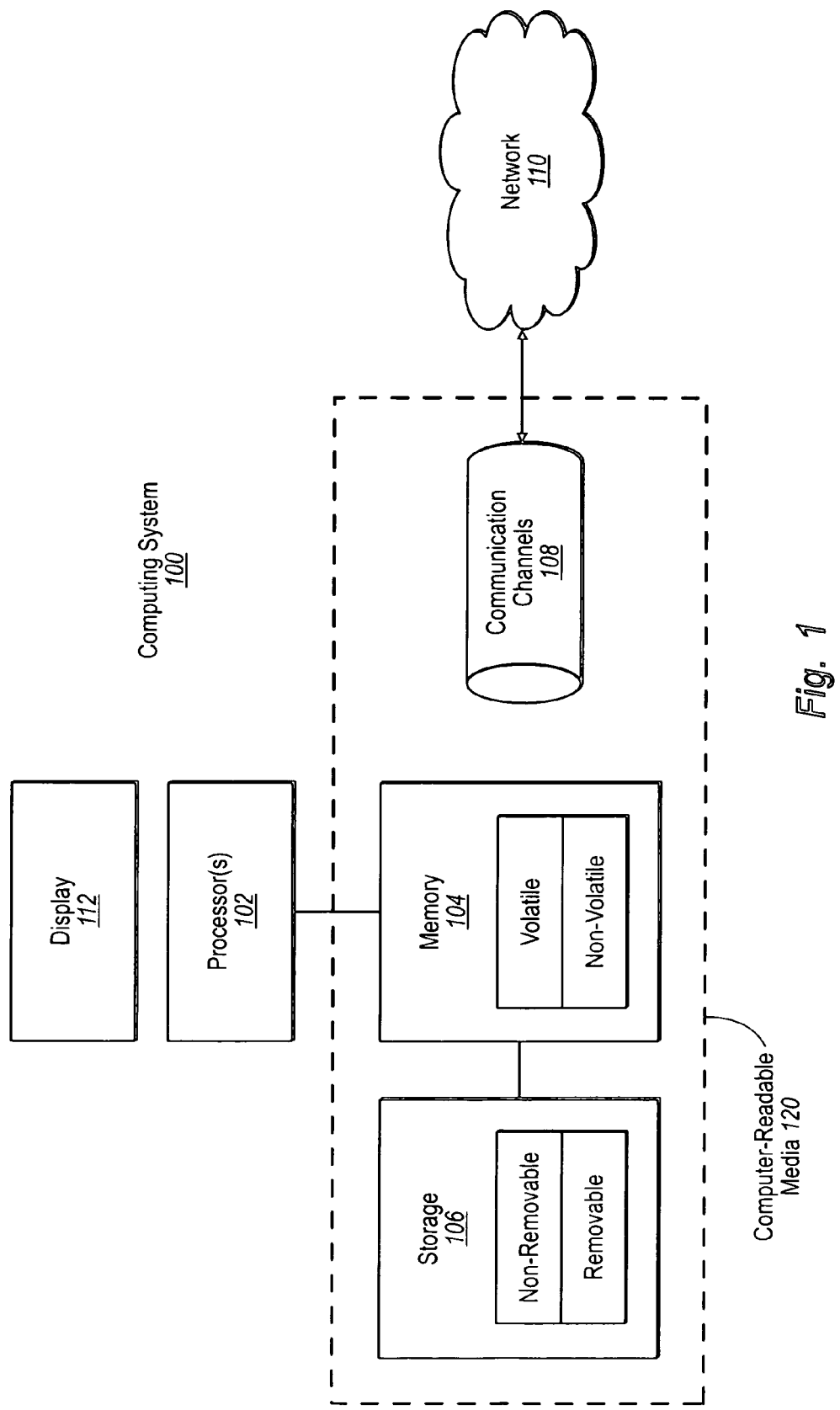
FIG. 1 schematically illustrates a suitable computing environment that may implement features of the present invention.

The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not been conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The computing system 100 may also have storage 106. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. For instance, the memory 104, storage 106 and/or communication channels 108 (either singly or in combination) may each be considered a computer-readable media 120. In this description and in the claims, a "physical" computer-readable media refers to either or both of memory 104 and storage 106, or portions thereof.

Computer-executable instructions comprise, for example, instructions and data which cause a general purpose computer, special purpose computer, or special purpose processing device to perform a certain function or group of functions. For instance, computer-executable instructions in the memory 104, storage and/or on the communication channels 108 may director the processor(s) to cause items to be displayed on a display 112 of the computing system 110. The display 112 is illustrated symbolically as a simple box, although the display will take a wide variety of forms depending on the nature of the computing system 100, and depending on the designers' choices.

Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 4:
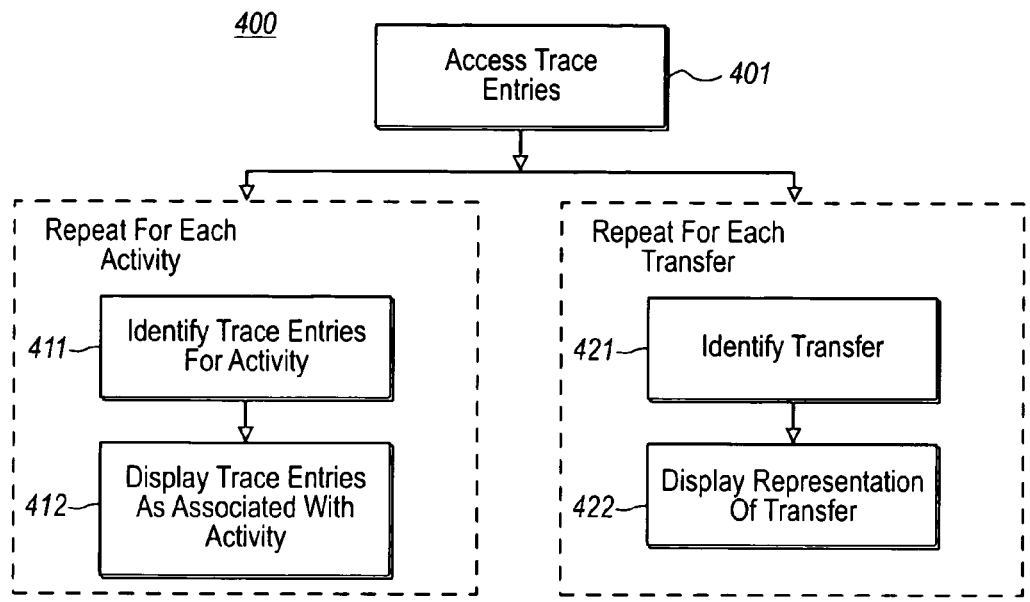
FIG. 4 illustrates a flowchart of a method for automatically causing to be displayed trace historical data in accordance with the principles of the present invention.

FIG. 2 illustrates example schematic data structures and flows 200 that may be used to implement aspects of the principles of the present invention to visually represent trace historical data. The data structures and flows 200 may be implemented in the context of the computing system 100 of FIG. 1, although that is not required by any means. FIG. 4 illustrates a flowchart of a method 400 for a computing system automatically causing trace historical data to be displayed on its display. For instance, when implemented by the computing system 100 of FIG. 1, the trace historical data may be displayed on the display 112.

The display of trace historical data may be made in a manner that the flow of processing activity may be observed across multiple activities performed by multiple processing entities. This allows for a more intuitive understanding of the context of each trace entry within the entire flow of processing across multiple processing entities. Thus, the bulk of trace information may be more easily digested, allowing for more efficient diagnosis of software performance issues, even when multiple processing entities are involved. As the example data structures and flows 200 of FIG. 2 may be used to understand the method 400 of FIG. 4, the method 400 of FIG. 4 will be described with frequent reference to the data structures and flows 200 of FIG. 2.

Referring to the method 400 of FIG. 4, trace entries representing trace historical data are accessed (act 401). In the example of FIG. 2, the access module 210 access and provides trace entries 211. In this particular example, there are 14 trace entries labeled 211A through 211M, though the principles of the present invention may be performed with any number of trace entries. Each trace entry records an action that was performed by one of processing entities 212. A processing entity may be on the same or different computing system, and may or may not be implemented on the same computing system performing the method 400 of FIG. 4. The processing entity may be a computer program, program component, process, thread, thread portion, or any other hardware or software that is capable of processing or being processed.

While the processing entity was previously executing, the trace entries were generated to describe actions that the processing entity was performing at particular points in time. If there was a trace entry that was generated by another computing system, the trace entry may be accessed over a network or over an out-of-band mechanism from the other computing system. The trace entry might also be accessed from local memory and/or storage. The precise mechanism by which the trace entries are accessed is not important to the principles of the present invention. Suffice it to say that there are a large number of mechanisms by which the trace entries may be accessed.

FIG. 3 schematically represents a trace entry data structure 300, and represents just one of numerous possible data structures that may be used to represent a trace entry, and thus should not be construed to limit the principles of the present invention. The trace entry 300 is illustrated simply to show the types of data that might be included in a trace entry, and not to suggest any physical restriction on the structure of a trace entry.

The trace entry 300 may include an action description 301 that represents the action that was performed by the processing entity. The action description 301 may be human-readable, although that need not be the case. The types of actions that may be recorded may vary widely depending on the situation, and depending on what actions are desired and helpful to be captured through the trace historical data. The principles of the present invention are in no way limited to the type of actions recorded in the trace entry. However, examples of actions recorded in the trace entries may include the sending of a message, the setting of a particular value, the branching of code, the passing of control to another component or processing entity, a variable becoming a certain value or moving into a certain value range, the occurrence of a processor interrupt, the writing to non-volatile memory, or an infinite variety of other possible actions. Even actions that may not be interesting to the evaluation of the processing entity's performance may be recorded.

The trace entry 300 may additionally or alternatively have an action code 302 that may be directly or indirectly computer-readable, or may even be interpreted using extrinsic information to identify the action recorded. An action may even be implied by the absence of an expressed indication of the action in the trace entry 300.

The trace entry 300 also may include an activity identifier 303 that identifies the activity that the trace entry belongs to. In this description and the claims, an "activity" is a sequence of trace entries that have resulted from processing performed by a processing entity. As will become clearing hereinafter, the trace entries 211 may describe actions performed by a number of different processing entities. Accordingly, the trace entries 211 may include trace entries from different activities. The activity identifier 303 may be used to identify the trace sequence or "activity" that the trace comes from. The absence of an activity identifier may imply that the trace entry is part of a particular activity. Alternatively or in addition, extrinsic information may be used to identify the activity even if the trace entry itself contains no activity identifier per se.

The system identifier 304 may be used to identify the system that performed the processing that caused the activity to be generated. A system may include a physical computing system or a combination of physical computing systems. If the processing entities that are represented by the trace entries come from multiple systems, the system identifier 304 may be used to identify on which system the processing entity was running that caused the trace entry to be generated. Of course, the system identifier 304 may be eliminated if the trace entries all come from a single computing system or if the computing system is implied by the absence of the system identifier.

The trace entry 300 also includes a time stamp 305 that represents the rendering of time at the system that generated the trace entry at the approximately the time that the action recorded by the trace entry occurred. The trace entry 300 may also have correlation data 306 if the action 301 represents the partial or full passage of processing control from one processing entity to another. The correlation data 306 allows the actions on different processing entities to be correlated when those actions involved the transfer of processing control.

Figure 5:
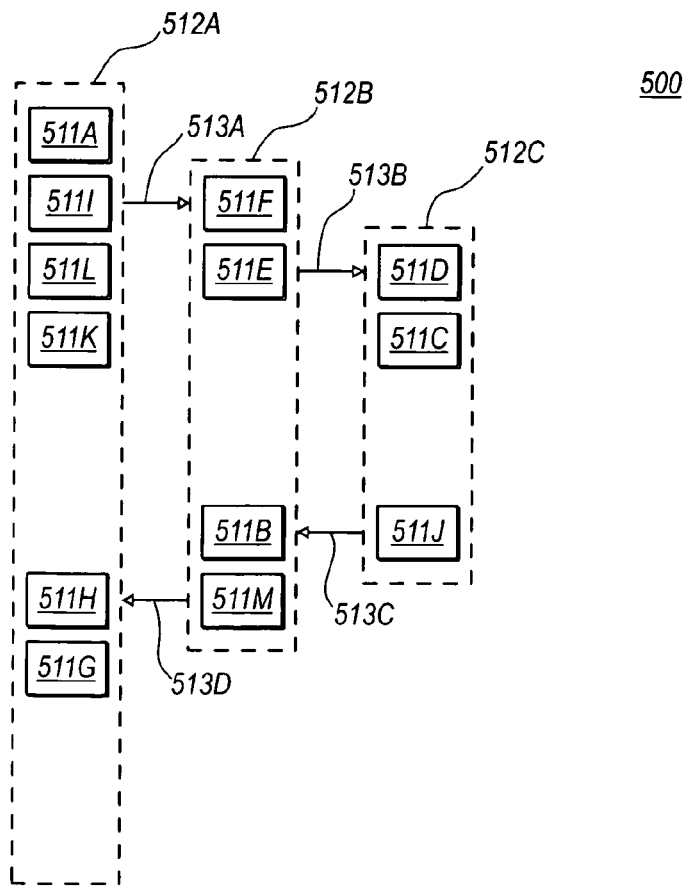
FIG. 5 illustrates a simple display that illustrates an activity graph including trace entries for each of multiple activities in accordance with a first embodiment of the present invention.

Although not yet apparent from the trace entries 211 of FIG. 2, the trace entries 211 come from three different activities performed by processing entities 212 represented in FIG. 2 symbolically as processing entities 212A, 212B and 212C. Referring to FIG. 4, the acts 411 and 412 are performed for each activity. FIG. 5 illustrates a simple user interface 500 that may be generated using the trace entries 211 of FIG. 2, and using the method 400 of FIG. 4. The simple user interface 500 is referred to herein as a "simple activity graph".

Referring back to FIG. 4, the trace entries corresponding to each processing entity are identified (act 411). In this case, referring to FIG. 2, trace entries 211A, 211I, 211L, 211K, 211H and 211G are identified as being performed in that order by the first processing entity 212A. This identification may be performed by the activity identification module 220. The identification may be performed by accessing and interpreting the activity identifier 303 (see FIG. 3) of each of the trace entries. The chronological ordering of the trace entries within a single activity may be identified by evaluating the time stamp 305 for each trace entry.

In the same manner, the trace entries 211F, 211E, 211B and 211M in that chronological order may be identified as being performed by the second processing entity 212B. Furthermore, the trace entries 211D, 211C and 211J in that chronological order may be identified as being performed by the third processing entity 212C. This identification may be automated without user intervention by automatically reading and evaluating the activity identifier 303 and the time stamp 305 for each of the trace entries 211.

Once the trace entries for any given processing entity have been identified optionally in chronological order within the activity, the computing system causes to be displayed on the display a representation of at least one of the associated trace entries as being associated with a first activity in an activity graph (act 412). For instance, if the method 400 is performed, by the computing system 100 of FIG. 1, the computer-readable media 120 may contain computer-executable instructions that, when executed by the processor(s) 102, causes the computing system 100 to represent the trace entries on display 112. Referring to FIG. 2, this display rendering may be performed by the display renderer 240.

For instance, FIG. 5, as previously mentioned, represents a basic activity graph 500 that may be generated on the display 112. A more complex and detailed example of an activity graph 600 is given with respect to FIG. 6. The simple activity graph 500 includes a representation 512A (hereinafter, "activity 512A") of an activity formulated from actions performed by the first processing entity 212A to perform a first task, a representation 512B (hereinafter, "activity 512B") of an activity formulated from actions performed by the second processing entity 212B to perform a second task, and a representation 512C (hereinafter, "activity 512C") of an activity formulated from actions performed by the third processing entity 212C to perform a third task.

In the example of FIG. 5, the activities are represented using vertical boxes with dashed lines in the form of an activity graph. However, the principles of the present invention are not limited to how the activities are represented on the display. There are numerous ways to represent an activity. In FIG. 5, the trace entries are represented as associated with an activity by having a corresponding visual representation of the trace entry included within the vertical box of the corresponding activity. In this example, the trace entries are represented using a simple box. Chronological ordering of trace entries for any given activity may be represented by the sequential ordering top-to-bottom of the corresponding trace entry box in the activity.

For instance, activity 512A is displayed with traces representations 511A, 511I, 511L, 511K, 511H and 511G in that order from top to bottom. This represents that trace entries 211A, 211I, 211L, 211K, 211H and 211G (in that order) represent a trace sequence activity for processing entity 212A towards the first task. Activity 512B is displayed with trace representations 511F, 511E, 511B and 511M; representing that trace entries 211F, 211E, 211B and 211M (in that order) represent a trace sequence activity for processing entity 212B towards the second task. Activity 512C is displayed with trace representations 511D, 511C and 511J; representing that trace entries 211D, 211C and 211J (in that order) represent a trace sequence activity for processing entity 213B towards the third task.

Thus, the principles of the present invention permit the automated display of activities performed by different processing entities using trace historical data documenting activities performed by the different processing entities. As will now be described in further detail, the principles of the present invention also allow for full or partial transfers of processing control between processing entities to be automatically identified and displayed.

For instance, walking through the example user interface 500 of FIG. 5, there are a variety of processing control transfers between activities. Some of the transfers may be partial transfers, in which the activity that transferred control continues processing and continues generation of trace entries. Others of the transfers may be full transfers, in which the processing entity that transferred control ceases processing and ceases generation of trace entries, at least until the processing entity receives processing control back.

In FIG. 5, the activity 512A represents that the trace entries of processing, entity 212A includes first in chronological order the trace entry 211A as represented by the trace 511A. The activity 512A then includes trace 511I, which corresponds to an action involving partial transfer of control to the activity 512B as represented by arrow 513A. Since this was only a partial transfer of control, activity 512A continues with traces 511L and 511K. Meanwhile, the activity 512B receives partial control as represented by the trace 511F. Subsequently, the activity 512B includes trace 511E, which involves the full transfer of control to activity 512C as represented by arrow 513B. This is a full transfer since the activity 512B does not perform further processing or trace generation until it receives control back from activity 512C. The activity 512C receives processing control as represented by trace 511D.

Subsequently, the activity 512C includes trace 511C, and then trace 511J involving transfer of control back to activity 512B as represented by arrow 513C. The activity 512B receives processing control which is documented in trace 511B. The activity 512B then transfers processing control back to activity 512A as represented by trace 511M, arrow 513D, and trace 511H. The activity 512A then includes trace 511G. Thus, the simple example of FIG. 5 involves four transfers of processing control between activities.

Referring back to FIG. 4, in order to properly display the transfers of processing control, acts 421 and 422 are performed for each transfer of control, whether a partial transfer or a full transfer. First, the transfer of processing control is first identified for each transfer (act 421). This identification may be automated by having a transfer identification module 230 (see FIG. 2) evaluate the trace entries 211. In this case, however, not all of the trace entries 211 involve the transfer of processing control. Instead, only trace entries 211I, 211F, 211E, 211D, 211J, 211B, 211M and 211H involve partial or full transfer, of processing control.

The transfer is identified by evaluating the action description or code for the trace entry. For processing entities that span a network, the transfer of processing control may be effected by the transmission and receipt of a message. For any given control transfer, the trace entry involved with sending control and the trace entry associated with receiving control are identified. This may be accomplished by using the correlation data 306 (see FIG. 3) of the trace entries. For instance, in the case of a network message, the message may include a specific identifier that is unique to that message. That way, the transfer identification module may identify the trace entry that records the action that initiated the control transfer in one activity, and the trace entry that records the action that completed the control transfer in the other activity. For control transfers that do not involve a network message, the correlation data may involve a data identifier for any data that is passed as part of the processing control transfer.

The control transfer identification (act 421) is performed for each transfer of control. From this, the transfer identification module may identify that the action recorded in trace 211I originated transfer of processing control from processing entity 212A, and that the action record in trace 211F completed the transfer of processing control to processing entity 212B. The transfer may then be visually represented on the display (act 422). For instance, in FIG. 5, arrow 513A is represented originating from trace representation 511I and ending at trace representation 511F. The activities 512A, 512B, and 512C are vertically adjusted so that the arrows are pointing sideways in this example. The rendering of the visual representation of the transfer may be performed by the display renderer 240 (see FIG. 2) once the transfer identification is made by the transfer identification module 230.

Similarly, the action recorded in trace 211E may be identified as originating transfer of processing control from processing entity 212B, and the action recorded in trace 211D may be identified as completing transfer of processing control to processing entity 212C (act 421). This second transfer may then be visually represented on the display (act 422). For instance, in FIG. 5, arrow 513B is represented originating from trace representation 511E and ending at trace representation 511D.

Furthermore, the action recorded in trace 211J may be identified as originating transfer of processing control from processing entity 212C, and the action recorded in trace 211B may be identified as completing transfer of processing control to processing entity 212B (act 421). This third transfer may then be visually represented on the display (act 422). For instance, in FIG. 5, arrow 513C is represented originating from trace representation 511J and ending at trace representation 511B.

Finally, the action recorded in trace 211M may be identified as originating transfer of processing control from processing entity 212B, and the action recorded in trace 211H may be identified as completing transfer of processing control to processing entity 212A (act 421). This last transfer in the example of FIGS. 2 and 5 may then be visually represented on the display (act 422). For instance, in FIG. 5, arrow 513D is represented originating from trace representation 511M and ending at trace representation 511H.

Figure 6:
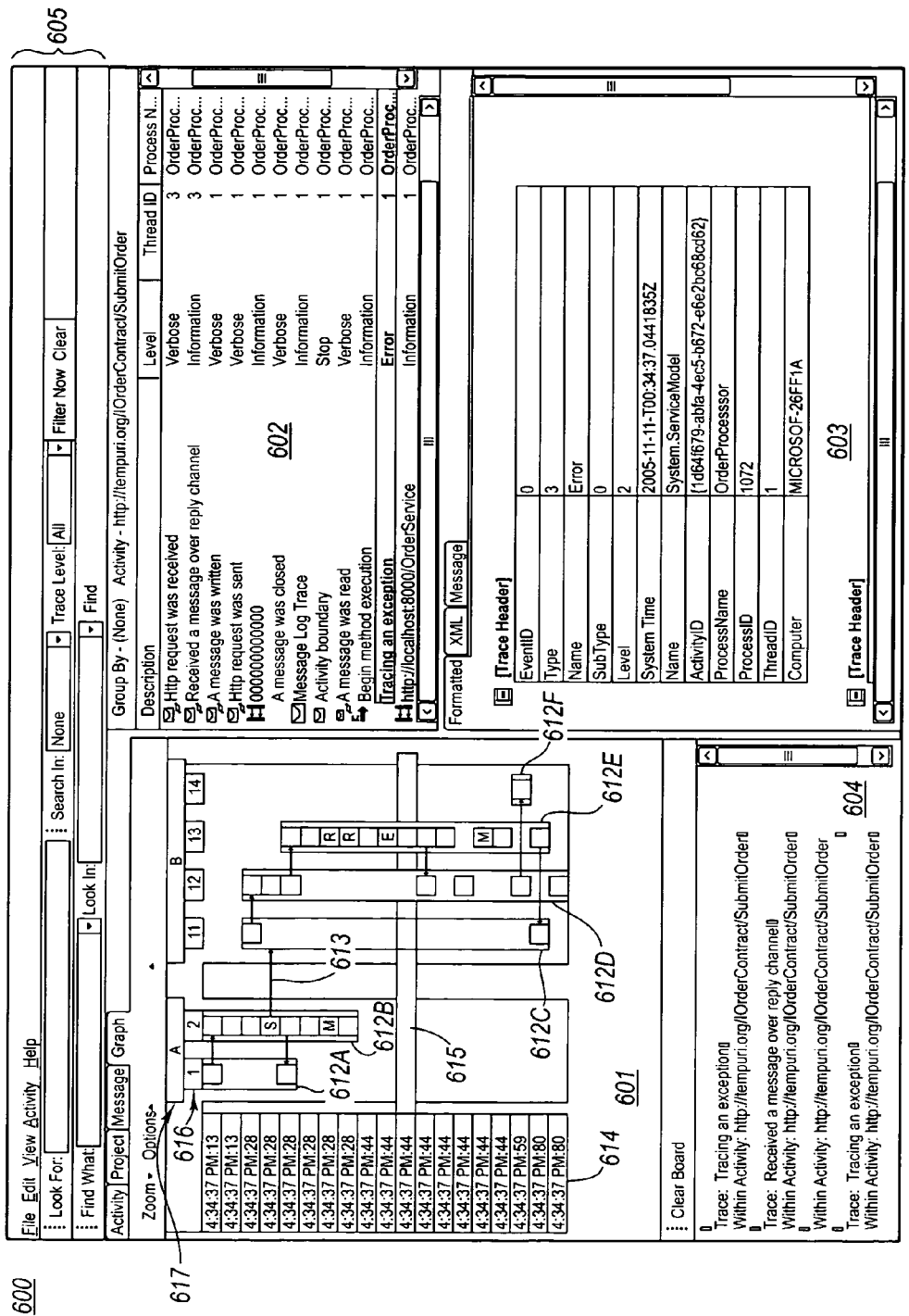
FIG. 6 illustrates a more extensive display that illustrates an activity graph including trace entries for each of multiple activities in accordance with a second embodiment of the present invention.

The principles of the present invention have been described with respect to a relatively simple activity graph of FIG. 5 in order to not obscure the principles of the present invention using a more complex example. However, the principles of the present invention may be used to automatically formulate a more complex and sophisticated visual representation of activity across multiple processing entities. FIG. 6 illustrates an example of a much more complex user interface 600.

The complex user interface 600 includes four frames 601, 602, 603 and 604, in additional to an administration area 605. The administration area 605 includes fields for searching and filtering the tracing information, and is not important for the principles of the present invention, and thus will not be described in further detail herein.

Frame 601 represents an activity graph. In this case, there are six total activities 612A, 612B, 612C, 612D, 612E and 612F, each resulting from actions performed by different processing entities identified on column header 616. Two of the activities 612A and 612B are performed by one system identified as system "A", and four of the activities 612C, 612D, 612E and 612F are performed by a processing entities on a second system identified as system "B". There are also various arrows showing transfer of control between processing entities. One of the arrows 613 shows not only control between processing entities, but also transfer of processing control across systems. Arrows showing transfer of control across systems may be visually distinguished (e.g., shown in a different color, or with a different type of arrow) from transfers of control between processing entities within a single system. A time field 614 shows the approximate trace time of the trace aligned to the right. The column header 616 includes a box that describes the name of the processing entity performing the actions documented by traces in that column. The processing entities generating activities 612A and 612B are named "1" and "2", respectively. The processing entities generating activities 612C through 612F are named "11" through "14", respectively. Another column header 617 includes a system identification that identifies the system that runs the processing entities shown below the corresponding system identification.

Frame 602 includes descriptive information for the trace information before and after and including the trace selected by the highlighted row. The Clear Board frame 604 may be used in the diagnostic process to show prior diagnostic actions taken.

Figure 7:
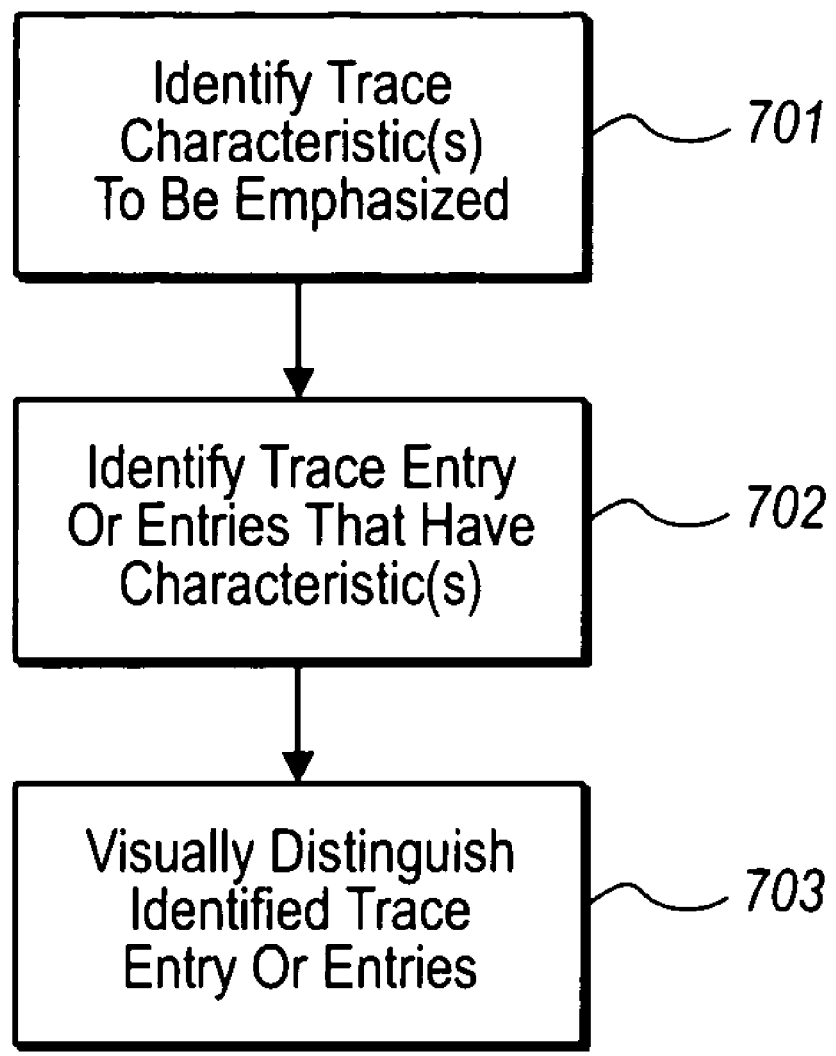
FIG. 7 illustrates a method for visually identifying characteristics of trace entries that may be used consistent with the principles of the present invention.

FIG. 7 illustrates a flowchart for visually distinguishing one trace from another in accordance with one embodiment of the present invention. As shown in FIGS. 5 and 6, the principles of the present invention may be used to automatically formulate a user interface (e.g., an activity graph) in which each trace performed by a processing entity is shown associated with the corresponding activity, and in which transfers of control between processing entities are intuitively visualized. This allows a human trace evaluator to intuitively view each trace in the context of processing activities that span multiple processing entities or even multiple computing systems. FIG. 7 includes a flowchart of a method 700 that permits further information to be visually conveyed to a human evaluator in an intuitive fashion.

In particular, the method 700 identifies trace characteristics that are to be visually emphasized (act 701), identifies one or more trace entries that have the trace characteristic (act 702), and then causes the identified trace entries that have the trace characteristic to be displayed in a visually distinctive manner as compared to one or more trace entries that do not have the trace characteristic (act 703).

For instance, referring to FIG. 6, there are several traces that are emphasized. The traces that include the letter "S" may be traces in which a message or control transfer is sent, traces that include the letter "R" may be traces in which a message or control transfer is received, traces that include the letter "E" may be traces in which a web message is executed, and traces that include the letter "M" may be traces in which a message is logged. A lighter trace may indicate a selected trace for which trace information is provided in frame 603.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system having a display, a method for the computing system automatically causing to be displayed trace historical data on the display in a manner that the flow of processing activity may be observed across multiple activities performed by multiple processing entities, the method comprising the following:

an act of accessing a plurality of trace entries;

an act of identifying from the plurality of trace entries a first set of one or more trace entries that correspond to actions performed by a first processing entity;

an act of displaying a representation of the first set of one or more trace entries as being associated with a first activity in an activity graph, wherein the first set of trace entries are represented with corresponding boxes in a first vertical column in a top-to-bottom chronological ordering, with each box in the first vertical column representing a different trace entry;

an act of identifying from the plurality of trace entries a second set of one or more trace entries that correspond to actions performed by a second processing entity;

an act of displaying a representation of the second set of one or more trace entries as being associated with a second activity of the activity graph, wherein the second set of trace entries are represented with corresponding boxes in a second vertical column in a top-to-bottom chronological ordering, with each box in the second vertical column representing a different trace entry;

an act of identifying a transfer of processing control between the first and second activities and evaluating whether the transfer is a full transfer of processing control or only a partial transfer of processing control, wherein the full transfer of processing control is a transfer from a particular activity that does not have any additional corresponding trace entries for that particular activity until that particular activity receives control back from another activity, and wherein the partial transfer of processing control is a transfer from the particular activity that does have additional corresponding trace entries for that particular activity prior to the particular activity receiving control back; and an act of displaying a representation of the transfer of processing control between the first and second activities along with the displayed representation of the first and second set of trace entries and in such a way as to distinguish whether the transfer of processing control is a full transfer of processing control or only a partial transfer of processing control, wherein each of a plurality of transfers of processing control displayed with the first and second set of trace entries is displayed in such a way as to represent whether each corresponding transfer of processing control is a full transfer or a partial transfer of processing control and wherein displaying the representation of the transfer of processing control includes displaying an arrow between a box in the first vertical column and a box in the second vertical column after altering a vertical spacing between two boxes in the first and second vertical columns so that the arrow is aligned perpendicularly to the first and second vertical column.

2. A method in accordance with claim 1, wherein the first processing entity and the second processing entity are implemented on the same computing system.

3. A method in accordance with claim 1, wherein the first processing entity and the second processing entity are implemented on different computing systems.

4. A method in accordance with claim 3, wherein the transfer of processing control between the first and second activities comprises a network message between the first and second processing entities.

5. A method in accordance with claim 1, wherein the transfer of processing control comprises a partial transfer of processing control after which processing continues in the first and second processing entities.

6. A method in accordance with claim 1, wherein the transfer of processing control comprises a full transfer of processing control after which processing is at least temporarily suspended on either of the first or second processing entities.

7. A method in accordance with claim 1, wherein the first processing entity is a computer program.

8. A method in accordance with claim 1, wherein the first processing entity is a process.

9. A method in accordance with claim 1, wherein the first processing entity is a thread.

10. A method in accordance with claim 1, wherein the partial transfer is a first partial transfer, the method further comprising:
    an act of identifying from the plurality of trace entries a third set of one or more trace entries that correspond to actions performed by a third processing entity;
    an act of causing to be displayed on the display a representation of at least one of the third set of one or more trace entries as being associated with a third activity of the activity graph;
    an act of identifying a new transfer of processing control between the second and third activities; and
    an act of causing to be displayed on the display a representation of the transfer of processing control between the second and third activities in such a way as to clarify whether the transfer of processing control between the second and third activities is a full or partial transfer of control.

11. A method in accordance with claim 1, wherein displaying the representation of the at least partial transfer of processing control between the first and second activities comprises the following:
    an act of causing the transfer of processing control to be displayed in a manner that represents the timing of the transfer within the chronological order of the first and second sets of trace entries.

12. A method in accordance with claim 1, wherein displaying the representation of at least one of the first set of one or more trace entries as being associated with a first activity in an activity graph comprises the following:
    an act of identifying a trace characteristic that is to be emphasized;
    an act of identifying one or more trace entries that have the trace characteristic; and
    an act of causing the one or more trace entries that have the trace characteristic to be displayed in a visually distinctive manner as compared to one or more trace entries that do not have the trace characteristic.

13. A computer storage media having stored computer-executable instructions that, when executed by one or more processors of a computing system, cause the computing system to perform the method of claim 1.

14. A computing system comprising:
    a display;
    one or more processors;
    one or more physical computer-readable media having thereon computer-executable instructions that, when executed by the one or more processors, causes the computing system to perform the following:
    an act of accessing a plurality of trace entries;
    an act of identifying from the plurality of trace entries a first set of one or more trace entries that correspond to actions performed by a first processing entity;
    an act of displaying a representation of the first set of one or more trace entries as being associated with a first activity in an activity graph, wherein the first set of trace entries are represented with corresponding boxes in a first vertical column in a top-to-bottom chronological ordering, with each box in the first vertical column representing a different trace entry;
    an act of identifying from the plurality of trace entries a second set of one or more trace entries that correspond to actions performed by a second processing entity;
    an act of displaying a representation of the second set of one or more trace entries as being associated with a second activity of the activity graph, wherein the second set of trace entries are represented with corresponding boxes in a second vertical column in a top-to-bottom chronological ordering, with each box in the second vertical column representing a different trace entry;
    an act of identifying a transfer of processing control between the first and second activities and evaluating whether the transfer is a full transfer of processing control or only a partial transfer of processing control, wherein the full transfer of processing control is a transfer from a particular activity that does not have any additional corresponding trace entries for that particular activity until that particular activity receives control back from another activity, and wherein the partial transfer of processing control is a transfer from the particular activity that does have additional corresponding trace entries for that particular activity prior to the particular activity receiving control back; and
    an act of displaying a representation of the transfer of processing control between the first and second activities along with the displayed representation of the first and second set of trace entries and in such a way as to distinguish whether the transfer of processing control is a full transfer of processing control or only a partial transfer of processing control, wherein each of a plurality of transfers of processing control displayed with the first and second set of trace entries is displayed in such a way as to represent whether each corresponding transfer of processing control is a full transfer or a partial transfer of processing control, and wherein displaying the representation of the transfer of processing control includes displaying an arrow between a box in the first vertical column and a box in the second vertical column after altering a vertical spacing between two boxes in the first and second vertical columns so that the arrow is aligned perpendicularly to the first and second vertical column.

\* \* \* \* \*